(12) United States Patent
Lindholm et al.

(10) Patent No.: US 8,385,966 B2
(45) Date of Patent: Feb. 26, 2013

(54) METHOD, APPARATUS AND COMPUTER PROGRAM FOR POWER CONTROL RELATED TO RANDOM ACCESS PROCEDURES

(75) Inventors: Jari Lindholm, Palojoki (FI); Juha S. Korhonen, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 587 days.

(21) Appl. No.: 12/387,661

(22) Filed: May 5, 2009

(65) Prior Publication Data

US 2009/0286566 A1 Nov. 19, 2009

Related U.S. Application Data

(60) Provisional application No. 61/126,617, filed on May 5, 2008.

(51) Int. Cl.
*H04B 7/00* (2006.01)
(52) U.S. Cl. ...................... 455/522; 455/521
(58) Field of Classification Search .................. None
See application file for complete search history.

(56) References Cited

U.S. PATENT DOCUMENTS

| | | | | |
|---|---|---|---|---|
| 5,722,051 | A * | 2/1998 | Agrawal et al. | 455/69 |
| 2003/0076812 | A1* | 4/2003 | Benedittis | 370/350 |
| 2003/0119452 | A1* | 6/2003 | Kim et al. | 455/69 |
| 2004/0001429 | A1* | 1/2004 | Ma et al. | 370/210 |
| 2007/0149206 | A1* | 6/2007 | Wang et al. | 455/450 |
| 2007/0201397 | A1* | 8/2007 | Zhang | 370/329 |

OTHER PUBLICATIONS

Editor (motorola), 3GPP Draft; 3rd generation partnership project, mobile competence centre; vol. RAN WG1, Feb. 15, 2008, whole document.*
Interdigital Communications Corporation; "E-Ultra Uplink Power Control Proposal and Evaluation"; vol. RAN WG!, Jun. 22, 2007, whole document.*
Editor (Motorola): 3GPP Draft; R1-081056—36213-81 0-CR, 3rd Generation Partnership Project (3GPP), Mobile Competence Centre ; 650, Route Des Lucioles ; F-06921 Sophia-Antipolis Cedex ; France, vol. RAN WG1, No. Sorrento, Italy; 20080215, Feb. 15, 2008, XP050109512.*
NTT Docomo et al: "Transmission Power Control in E-UTRA Uplink" 3GPP Draft; R1-070870 Transmission Power Control in E-UTRA Uplink, 3rd Generation Partnership Project (3GPP), Mobile Competence Centre ;650, Route Des Lucioles ; F- 06921 Sophia-Antipolis Cedex ; France, vol. RANIWG1, No. St. Louis, USA; 20070206, Feb. 6, 2007, XP05010.*

(Continued)

*Primary Examiner* — Crystal L Hammond
(74) *Attorney, Agent, or Firm* — Harrington & Smith

(57) ABSTRACT

A first power control adjustment state g(i) and a second power control adjustment state f(i) are initialized for i=0 to each reflect an open loop power control error. An initial transmit power for a shared uplink channel is computed using full pathloss compensation. The computed initial transmit power depends on a preamble power of a first message sent on an access channel, and the initial transmit power is initialized with the second power control adjustment state f(0). A third message is sent from a transmitter on an uplink shared channel at the initial transmit power. In various implementations, the power for i=0 on the uplink control channel is also initialized similar to the initial transmit power for the third message and using full pathloss compensation, and after the third message (and retransmissions of it), subsequent messages sent on the uplink shared channel are sent at a power that is computed using fractional pathloss compensation.

17 Claims, 5 Drawing Sheets

OTHER PUBLICATIONS

IPWIRELESS: "Initial Access Procedure and Uplink Synchronisation" 3GPP Draft; R1-060637, 3rd Generation Partnership Project (3GPP), Mobile Competence Centre ; 650, Route Des Lucioles ; F-06921 Sophia-Antipolis Cedex ; France, vol. RAN WG1, No. Denver, USA; 20060209, Feb. 9, 2006, XP050101560.*

"3rd Generation Partnershp Project; Technical Specification Group Radio Access Network; Evolved Universal Terrestrial Radio Access (E-UTRA) and Evolved Universal terrestrial Radio Access Network (E-UTRAN); Overall description; Stage 2 (Release 8)". 3GPP TS 36.300 V8.4.0 (Mar. 2008), 5 pgs.

"3rd Generation Partnership Project; Technical Specification Group Radio Access Network; Evolved Universal Terrestrial Radio Access (E-UTRA); Physical layer procedures (Release 8)", 3GPP TS 36.213 V8.2.0 (Mar. 2008), 30 pgs.

Motorola: 3GPP Draft; R1-081056—36213-810-CR, 3rd Generation Partnership Project (3GPP), Mobile Competence Centre; vol. RAN WG1, No. Sorrento, Italy; Feb. 15, 2008, XP050109512.

NTT DoCoMo et al: "Transmission Power Control in E-UTRA Uplink" 3GPP Draft, R1-070870; vol. RAN WG1, No. St. Louis, USA; Feb. 6, 2007, XP050104882.

Qualcomm Europe: "RACH sequences and planning" 3GPP Draft; R1-062690; vol. RAN WG1, No. Seoul, Korea; Oct. 4, 2006, XP050103179.

IPWireless: "Initial Access Procedure and Uplink Synchronisation" 3GPP Draft; R1-060637; vol. RAN WG1, No. Denver, USA , Feb. 9, 2006, XP050101560.

NTT DoCoMo et al: "Transmission Power Control in E-UTRA Uplink" 3GPP Draft; R1-063316; vol. RAN WG1, No. Riga, Latvia; Nov. 2, 2006, XP050103761.

Interdigital Communications Corporation: "E-UTRA Uplink Power Control Proposal and Evaluation" 3GPP Draft; R1-072781; vol. RAN WG1, No. Orlando, USA; Jun. 22, 2007, XP050106465.

Nokia et al: "Clarifications on the Out-of sync handling for UTRA TDD" 3GPP Draft; R1-00/1097; vol. RAN WG1, No. Berlin, Germany; Aug. 27, 2000, XP050093021.

3GPP TS 36.321 V8.0.0 (Dec. 2007) 3rd Generation Partnership Project; Technical Specification Group Radio Access Network; Evolved Universal Terrestrial Radio Access (E-UTRA) Medium Access Control (MAC) protocol specification (Release 8).

* cited by examiner

METHOD, APPARATUS AND COMPUTER PROGRAM FOR POWER CONTROL RELATED TO RANDOM ACCESS PROCEDURES

CROSS-REFERENCE TO RELATED APPLICATION

This patent application claims priority under 35 U.S.C. §119(e) from U.S. Provisional Patent Application No. 61/126,617, filed May 5, 2008, which is hereby incorporated by reference herein in its entirety, including Exhibits.

TECHNICAL FIELD

The exemplary and non-limiting embodiments of this invention relate generally to wireless communication systems, methods, devices and computer programs and, more specifically, relate to techniques for power control on different uplink messages sent from a communication device.

BACKGROUND

Various abbreviations that appear in the specification and/or in the drawing figures are defined as follows:
 3GPP third generation partnership project
 DL downlink
 DRX discontinuous reception
 eNB EUTRAN Node B (evolved Node B)
 EUTRAN evolved UTRAN (also referred to as LTE)
 LTE long term evolution
 MAC medium access control
 MME mobility management entity
 Node B base station
 OFDMA orthogonal frequency division multiple access
 PC power control
 PDCCH physical downlink control channel
 PDCP packet data convergence protocol
 PDSCH physical downlink shared channel
 PHY physical
 PL path loss
 PRACH physical random access channel
 PUSCH physical uplink shared channel
 RACH random access channel
 RA-RNTI random access radio network temporary identifier
 RLC radio link control
 RRC radio resource control
 SC-FDMA single carrier, frequency division multiple access
 TA timing advance
 UE user equipment
 UL uplink
 UTRAN universal terrestrial radio access network A proposed communication system known as evolved UTRAN (E-UTRAN, also referred to as UTRAN-LTE, E-UTRA or 3.9 G) is currently under development within the 3GPP. The current working assumption is that the DL access technique will be OFDMA, and the UL access technique will be SC-FDMA.

One specification of interest to these and other issues related to the invention is 3GPP TS 36.300, V8.4.0 (2008-03), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

FIG. 1A reproduces FIG. 4-1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1-MME interface and to a Serving Gateway (S-GW) by means of a S1-U interface. The S1 interface supports a many-to-many relation between MMEs/Serving Gateways and eNBs.

Reference can also be made to 3GPP TS 36.321, V8.0.0 (2007-12), 3rd Generation Partnership Project; Technical Specification Group Radio Access Network; Evolved Universal Terrestrial Radio Access (E-UTRA) Medium Access Control (MAC) protocol specification (Release 8).

Also of interest herein are the random access procedures of the LTE (E-UTRA) system. These procedures are described in 3GPP TS 36.300 v.8.4.0 at section 10.1.5 (attached to the priority document as Exhibit A), shown at FIG. 1B for the Contention Based Random Access Procedure and at FIG. 1C for the Non-Contention Based Random Access Procedure. These respectively reproduce FIGS. 10.1.5.1-1 and 10.1.5.1-2 of 3GPP TS 36.300 v.8.4.0, and Exhibit A of the priority document details the various steps shown.

Briefly, the UE transmits a random access preamble and expects a response from the eNB in the form of a so-called Message 2 (e.g., Random Access Response at FIGS. 1B and 1C). Message 2 is transmitted on a DL shared channel DL-SCH (PDSCH, the PDCCH) and allocates resources on an UL-SCH (PUSCH). The resource allocation of Message 2 is addressed with an identity RA-RNTI that is associated with the frequency and time resources of a PRACH, but is common for different preamble sequences. The Message 2 contains UL allocations for the transmissions of a Message 3 in the UL (e.g., step 3 of the Contention Based Random Access Procedure at FIG. 1B).

RACH preambles are transmitted by the UEs using a full path-loss compensation PC formula. The target is that reception RX level of those preambles at the eNB is the same, and so independent of path-loss. This is needed because several simultaneous preamble transmissions can take place in the same PRACH resource and in order to detect them, their power at the eNB needs to be roughly the same to avoid the well-known near-far problem for spread spectrum transmissions. However subsequent uplink transmissions on the PUSCH are orthogonal, and so called fractional power control can be used. This allows higher transmit TX powers for UEs that are near the eNB because interference that those UEs generate to neighbor cells is small as compared to cell edge UEs. This method allows higher average uplink bit rates on the PUSCH.

In general, the eNB does not know what is the path-loss value used by the UE in its full PL compensation PC formula used for the UE's RACH message. In the case of a UE being handed-over from another eNB, an estimate of the path-loss value could be provided to the target cell/eNB based on UE measurement reports sent to the serving eNB prior to the handover. However, for an initial access or for UL or DL data arrival this is not possible since there is no handover. Because of this, the eNB does not know the power difference between the UE's RACH preamble transmission and the UE's transmission using the PUSCH power formula.

It has been agreed that Message 2 contains a power control command for transmission of Message 3, but the definition and objective of that command is not yet specified. Therefore the eNB does not have sufficient information to give a correct power control command in response to the UE's RACH message. The result then, and as mentioned above, is that the power that the UE uses for transmission of Message 3 is not known to the eNB if the UE uses the PUSCH PC formula for sending Message 3.

The problem therefore may be stated as how best to define a transition from the full path loss compensated preamble transmission to the PUSCH (fractional) power control system.

SUMMARY

In accordance with an exemplary embodiment of the invention is a method that comprises using a processor to initialize for i=0 a first power control adjustment state g(0) for an uplink control channel and a second power control adjustment state f(i) for an uplink shared channel to each reflect an open loop power control error; using the processor to compute an initial transmit power for the uplink shared channel using full pathloss compensation, wherein the initial transmit power depends on a preamble power of a first message sent on an access channel, and is initialized with the second power control adjustment state f(0); and sending from a transmitter a third message on the uplink shared channel at the initial transmit power.

In accordance with an exemplary embodiment of the invention is a computer readable memory storing a computer program that when executed by a processor results in actions. In this embodiment the actions comprise: initializing for i=0 a first power control adjustment state g(0) for an uplink control channel and a second power control adjustment state f(i) for an uplink shared channel to each reflect an open loop power control error; computing an initial transmit power for the uplink shared channel using full pathloss compensation, wherein the initial transmit power depends on a preamble power of a first message sent on an access channel, and is initialized with the second power control adjustment state f(0); and outputting the initial transmit power for transmission of a third message on the uplink shared channel.

In accordance with an exemplary embodiment of the invention is an apparatus which comprises at least a processor and a transmitter. The processor is configured to initialize, for i=0, a first power control adjustment state g(0) for an uplink control channel and a second power control adjustment state f(i) for an uplink shared channel to each reflect an open loop power control error, and configured to compute an initial transmit power for the uplink shared channel using full pathloss compensation, in which the initial transmit power depends on a preamble power of a first message sent on an access channel, and the initial power is initialized with the second power control adjustment state f(0). The transmitter is configured to send a third message on the uplink shared channel at the initial transmit power.

These and other aspects of the invention are detailed with particularity below.

BRIEF DESCRIPTION OF THE DRAWINGS

The foregoing and other aspects of the exemplary embodiments of this invention are made more evident in the following Detailed Description, when read in conjunction with the attached Drawing Figures.

DETAILED DESCRIPTION

In the specific examples given below, the problem solved by those embodiments is how the power control formulas for PUSCH and PUCCH are taken in use during or after the Random Access procedure.

Figure 1A:
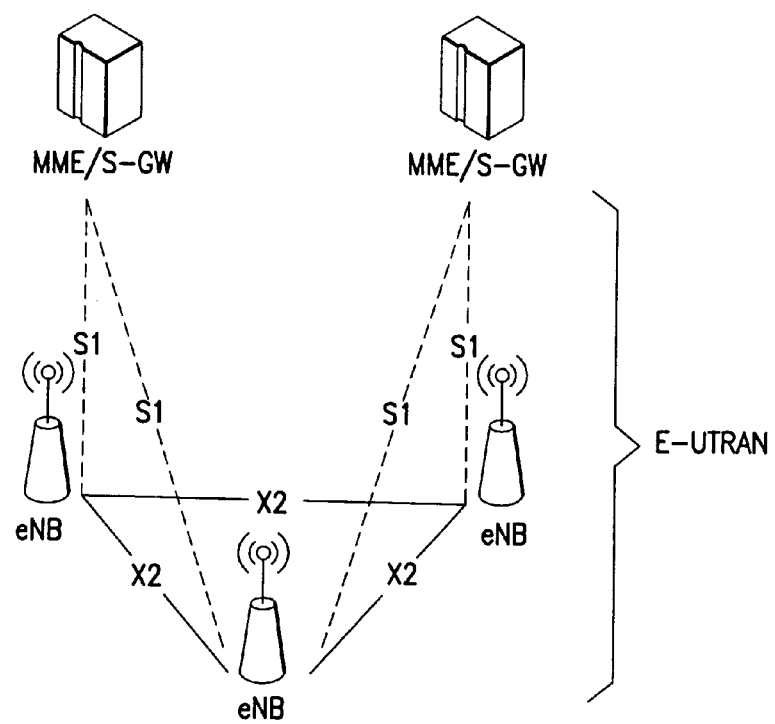
FIG. 1A reproduces FIG. 4-1 of 3GPP TS 36.300, and shows the overall architecture of the E-UTRAN system.
Figure 1B:
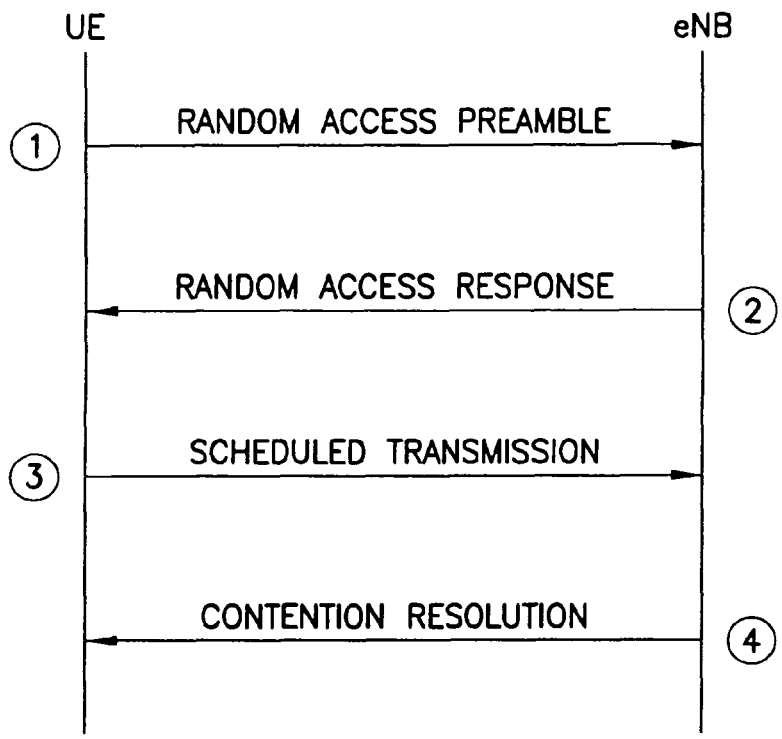
FIGS. 1B and 1C respectively reproduce FIGS. 10.1.5.1-1 and 10.1.5.1-2 of 3GPP TS 36.300 v8.4.0, Contention Based Random Access Procedure and Non-Contention Based Random Access Procedure.

To the inventors' knowledge this problem has not been solved before. Operation according to 3GPP TS 36.213 v.8.2.0 (attached to the priority document as Exhibit B) is that Message 3 (see FIG. 1B) is transmitted using the PUSCH PC formula taking into account the PC command received from the eNB in Message 2 (see FIGS. 1B and 1C). However, this does not specify how the UE specific parameters of the PUSCH and PUCCH power control formulas are initialized.

The PUSCH PC formula for the UE in the Ah subframe is defined at section 5.1.1.1 of 3GPP TS 36.213 v8.2.0 as follows:

$$P_{PUSCH}(i) = \min\{P_{MAX}, 10 \log_{10}(M_{PUSCH}(i)) + P_{O\_PUSCH}(j) + \alpha \cdot PL + \Delta_{TF}(TF(i)) + f(i)\} \text{(dBm)}; \quad [1]$$

where, $P_{MAX}$ is the maximum allowed power that depends on the UE power class $M_{PUSCH}(i)$ is the size of the PUSCH resource assignment expressed in number of resource blocks valid for subframe i.

$P_{O\_PUSCH}(j)$ is a parameter composed of the sum of a 8-bit cell specific nominal component $P_{O\_NOMINAL\_PUSCH}(j)$ signalled from higher layers for j=0 and 1 in the range of [−126, 24] dBm with 1 dB resolution and a 4-bit UE specific component $P_{O\_UE\_PUSCH}(i)$ configured by RRC for j=0 and 1 in the range of [−8, 7] dB with 1 dB resolution. For PUSCH (re)transmissions corresponding to a configured scheduling grant then j=0 and for PUSCH (re)transmissions corresponding to a received PDCCH with DCI format 0 associated with a new packet transmission then j=1.

$\alpha \in \{0, 0.4, 0.5, 0.6, 0.7, 0.8, 0.9, 1\}$ is a 3-bit cell specific parameter provided by higher layers PL is the downlink pathloss estimate calculated in the UE $\Delta_{TF}(TF(i)) = 10 \log_{10}(2^{MPR \cdot K_S} - 1)$ for $K_S = 1.25$ and 0 for $K_S = 0$ where $K_S$ is a cell specific parameter given by RRC TF(i) is the PUSCH transport format valid for subframe i MPR=modulation×coding rate=$N_{INFO}/N_{RE}$ where $N_{INFO}$ are the number of information bits and $N_{RE}$ is the number of resource elements determined from TF(i) and $M_{PUSCH}(i)$ for subframe i $\delta_{PUSCH}$ is a UE specific correction value, also referred to as a TPC command and is included in PDCCH with DCI format 0 or jointly coded with other TPC commands in PDCCH with DCI format 3/3A. The current PUSCH power control adjustment state is given by f(i) which is defined by:

$f(i)=f(i-1)+\delta_{PUSCH}(i-K_{PUSCH})$ if $f(*)$ represents accumulation where $f(0)=0$ and $K_{PUSCH}=4$ The UE attempts to decode a PDCCH of DCI format 0 and a PDCCH of DCI format 3/3A in every subframe except when in DRX $\delta_{PUSCH}=0$ dB for a subframe where no TPC command is decoded or where DRX occurs.

The $\delta_{PUSCH}$ dB accumulated values signalled on PDCCH with DCI format 0 are [−1, 0, 1, 3].

The $\delta_{PUSCH}$ dB accumulated values signalled on PDCCH with DCI format 3/3A are one of [−1, 1] or [−1, 0, 1, 3] as semi-statically configured by higher layers.

If UE has reached maximum power, positive TPC commands are not accumulated

If UE has reached minimum power, negative TPC commands shall not be accumulated

UE shall reset accumulation
    at cell-change
    when entering/leaving RRC active state
    when an absolute TPC command is received
    when $P_{O\_UE\_PUSCH}(j)$ is received
    when the UE (re)synchronizes $f(i)=\delta_{PUSCH}(i-K_{PUSCH})$ if $f(*)$ represents current absolute value where $\delta_{PUSCH}(i-K_{PUSCH})$ was signalled on PDCCH with DCI format 0 on subframe $i-K_{PUSCH}$ where $K_{PUSCH}=4$ The $\delta_{PUSCH}$ dB absolute values signalled on PDCCH with DCI format 0 are [−4, −1, 1, 4].

$f(i)=f(i-1)$ for a subframe where no PDCCH with DCI format 0 is decoded or where DRX occurs.

$f(*)$ type (accumulation or current absolute) is a UE specific parameter that is given by RRC.

The PUCCH PC formula for the UE in the ith subframe is defined at section 5.1.2.1 of 3GPP TS 36.213 v8.2.0 as follows:

$$P_{PUCCH}(i)=\min\{P_{MAX}, P_{O\_PUCCH}+PL+\Delta_{TF\_PUCCH}(TF)+g(i)\}(\text{dBm}); \quad [2]$$

where $\Delta_{TF\_PUCCH}(TF)$ table entries for each PUCCH transport format (TF) defined in Table 5.4-1 in [3] are given by RRC Each signalled $\Delta_{TF\_PUCCH}(TF)$ 2-bit value corresponds to a TF relative to PUCCH DCI format 0.

$P_{O\_PUCCH}$ is a parameter composed of the sum of a 5-bit cell specific parameter $P_{O\_NOMINAL\_PUCCH}$ provided by higher layers with 1 dB resolution in the range of [−127, −96] dBm and a UE specific component $P_{O\_UE\_PUCCH}$ configured by RRC in the range of [−8, 7] dB with 1 dB resolution.

$\delta_{PUCCH}$ is a UE specific correction value, also referred to as a TPC command, included in a PDCCH with DCI format 1A/1/2 or sent jointly coded with other UE specific PUCCH correction values on a PDCCH with DCI format 3/3A.

The UE attempts to decode a PDCCH with DCI format 3/3A and a PDCCH with DCI format 1A/1/2 on every subframe except when in DRX.

$\delta_{PUCCH}$ from a PDCCH with DCI format 1A/1/2 overrides that from a PDCCH with DCI format 3/3A when both are decoded in a given subframe.

$\delta_{PUCCH}=0$ dB for a subframe where no PDCCH with DCI format 1A1/2/3/3A is decoded or where DRX occurs.

$g(i)=g(i-1)+\Delta_{PUCCH}(i-K_{PUCCH})$ where $g(i)$ is the current PUCCH power control adjustment state with initial condition $g(0)=0$.

The $\delta_{PUCCH}$ dB values signalled on PDCCH with DCI format 1A/1/2 are [−1, 0, 1, 3].

The $\delta_{PUCCH}$ dB values signalled on PDCCH with DCI format 3/3A are [−1, 1] or [−1, 0, 1, 3] as semi-statically configured by higher layers.

If UE has reached maximum power, positive TPC commands are not accumulated

If UE has reached minimum power, negative TPC commands shall not be accumulated

UE shall reset accumulation
    at cell-change
    when entering/leaving RRC active state
    when $P_{O\_UE\_PUCCH}(j)$ is received
    when the UE (re)synchronizes The preamble PC formula for the UE's transmission on the RACH is:

$$P_{preamble}=P_{target}+PL+\Delta P_{rampup}(\text{dBm}), \quad [3]$$

where $P_{target}$ is the broadcasted target power;

PL is the path loss that UE estimates from DL; and $\Delta P_{rampup}$ is the power ramp-up applied for preamble retransmissions.

As can be seen above at equation [1], the formula for $P_{PUSCH}(i)$ depends on the current PUSCH power control adjustment state which is termed $f(i)$. For accumulation, this adjustment state depends on previous adjustments made in previous subframes, even for the case where $f(i)$ is set to an absolute value since it is set for the subframe $(i-K_{PUSCH})$. When the UE first sends data on the PUSCH, there is no previous subframe and so $i=0$, which is addressed in 3GPP TS 36.213 v8.2.0 as zeroing out the entire term so that $f(0)=0$. Further, while it is true that the UE is to reset its accumulation whenever it receives a new UE-specific portion $P_{O\_UE\_PUSCH}(j)$ of the $P_{O\_PUSCH}(j)$ (and similarly for $P_{O\_PUCCH}$), after a RACH access the UE has received no UE-specific portion and so it lacks that parameter to reset according to 3GPP TS 36.213.

Also, at equation [2] the power control formula for the PUCCH $P_{PUCCH}(i)$ depends on the current PUCCH power control adjustment state which is termed $g(i)$ and which also depends on previous adjustments made in previous PUCCH subframes. When the UE first sends a message on the PUCCH, there is no previous subframe and so $i=0$, which is similarly addressed in 3GPP TS 36.213 v8.2.0 as zeroing out the entire term so that $g(0)=0$.

Figure 1C:
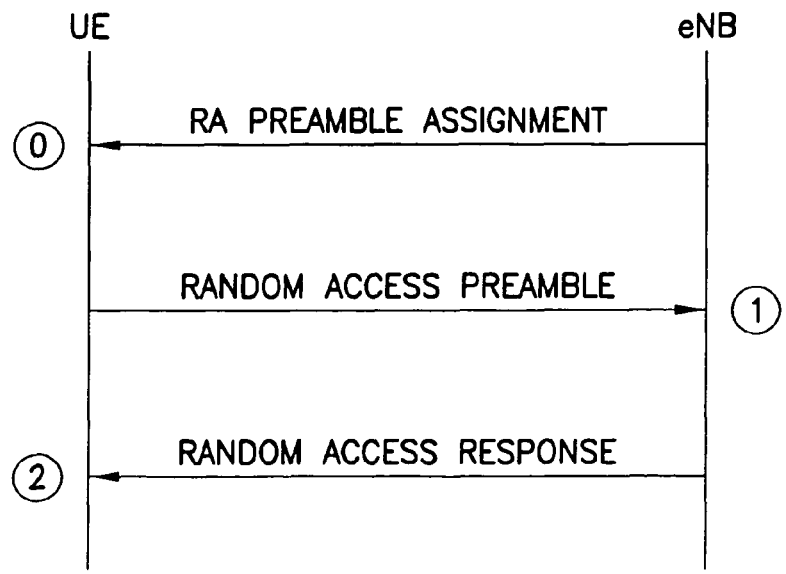

Consider the case for contention-less random access such as that shown at FIG. 1C, where the UE transmits preambles that are dedicated for that UE. The embodiments of the invention described for contention-less random access may also be used for contention based random access when it is considered that collisions will be infrequent enough in the contention-based system so as not to substantially affect operation in the cell.

According to an embodiment of the invention, the UE receives a power control command (e.g., $\Delta P_{PC}$) in the preamble response from the eNB, which is Message 2. The UE then initiates the PC formula for PUSCH and PUCCH, or compensates open loop error, according to the following equations:

$$P_{0\_UE\_PUSCH}+f(0)=\Delta P_{PC}+\Delta P_{rampup} \quad [4a]$$

$$P_{0\_UE\_PUCCH}+g(0)=\Delta P_{PC}+\Delta P_{rampup} \quad [4b]$$

These equations say that the sum of the UE specific power control constants ($P_{O\_UE\_PUSCH}$ or $P_{O\_UE\_PUCCH}$) and the power control initial states (f(0) or g(0)) is equal to the open loop power control error, taking into account the preamble power ramp-up. $\Delta P_{PC}$ is here assumed to be the difference between the target preamble power and the power that eNB actually observes. The actual value of $\Delta P_{PC}$ may be signalled directly by the eNB as the power control command, or to save on signalling overhead the eNB may explicitly signal a bit sequence (one, two or more bits) as the power control command which the receiving UE uses as an index to look up the true value $\Delta P_{PC}$ that is associated in a locally stored table with that index.

There are several options for dividing the correction between the UE specific constants and the power control states. For example, in a first option the UE specific power control terms $P_{O\_UE\_PUSCH}$ and $P_{O\_UE\_PUCCH}$ could be initialized to zero and the whole correction is covered by f(0) or g(0). In this case then equations 4a and 4b would read f(0)=g(0)=$\Delta P_{PC}$+$\Delta P_{rampup}$ for initiating the closed loop correction values for PUCCH and PUSCH. This can be always done as far as the power control state f is accumulated. (According to current 3GPP agreements g is always accumulating.) However, if f is modified with absolute PC commands, its dynamic range is limited and may not cover the whole open loop correction $\Delta P_{PC}$+$\Delta P_{rampup}$. If this happens, the part of the correction that cannot be included in f(0) could be taken into account by adjusting $P_{O\_UE\_PUSCH}$. As another example, a second option is to take the open loop error into account adjusting principally the UE specific power control terms $P_{O\_UE\_PUSCH}$ and $P_{O\_UE\_PUCCH}$. These parameters have a limited range and the part of the open loop error that cannot be compensated by adjusting these UE specific constants could be covered by initializing the power control states f(0) or g(0) to a nonzero value. The benefit of the first option is that the eNB would know the UE specific constants $P_{O\_UE\_PUSCH}$ and $P_{O\_UE\_PUCCH}$ (at least when f is accumulating), which might make later adjustments of these constants easier. However, the second option could be more natural because the purpose of the UE specific constants is mainly to compensate systematic errors in the PL determination and TX power setting and these are already visible as an error in the open loop power control of the preambles. Of course, the above two options are presented only as non-limiting examples and this aspect of the invention is not limited to only those two.

For the case of a dedicated preamble such as is shown at FIG. 1C or when the preamble collisions of a contention-based system are otherwise infrequent, the power for Message 3 may be generated by using the PUSCH PC formula directly according to the above explained embodiment of the invention. This may lead to UE transmit TX power that is unnecessarily high, but the inventors do not see this as a problem.

The inventors have determined that a problem could arise in the above explained procedure, specifically where two UEs transmit the same preamble sequence and use fractional PL compensation for Message 3. The problem appears most pronounced when the preamble of a UE with a large PL is received at the eNB stronger than the preamble of another UE with small PL. The fractional PC could result in Message 3 of the UE with the smaller PL being received at the eNB with a stronger signal strength than the Message 3 of the UE with the larger PL. This would of course make detection by the eNB of the weaker Message 3 less likely, despite the fact that in the above scenario the weaker Message 3 is from the UE who has received correct timing advance. Decoding of the stronger Message 3 is likely to fail because the timing advance of a wrong UE has been used when transmitting it. Further, if the timing advance for Message 3 transmissions are set based on the preamble of the UE with the larger PL, then the UE with the smaller PL would use a large power and the wrong TA value when transmitting its Message 3, and thereby generate interference to other transmissions.

To achieve improved performance when the UE performs contention based random access and when preamble collisions are assumed to be frequent, another embodiment of the invention defines the Message 3 power relative to preamble power, i.e. full path loss compensation used. The objective is that transmit TX power of Message 3 would not be unnecessary high. In one particular embodiment, this objective can be realized by using the following formula:

$$P_{Msg3} = P_{preamble} + \Delta_{0,preamble\_Msg3} + \Delta_{PC\_Msg3} + 10 \log_{10}(M_{PUSCH}(i)) + \Delta_{TF}(TF(i)). \quad [5]$$

Figure 2:
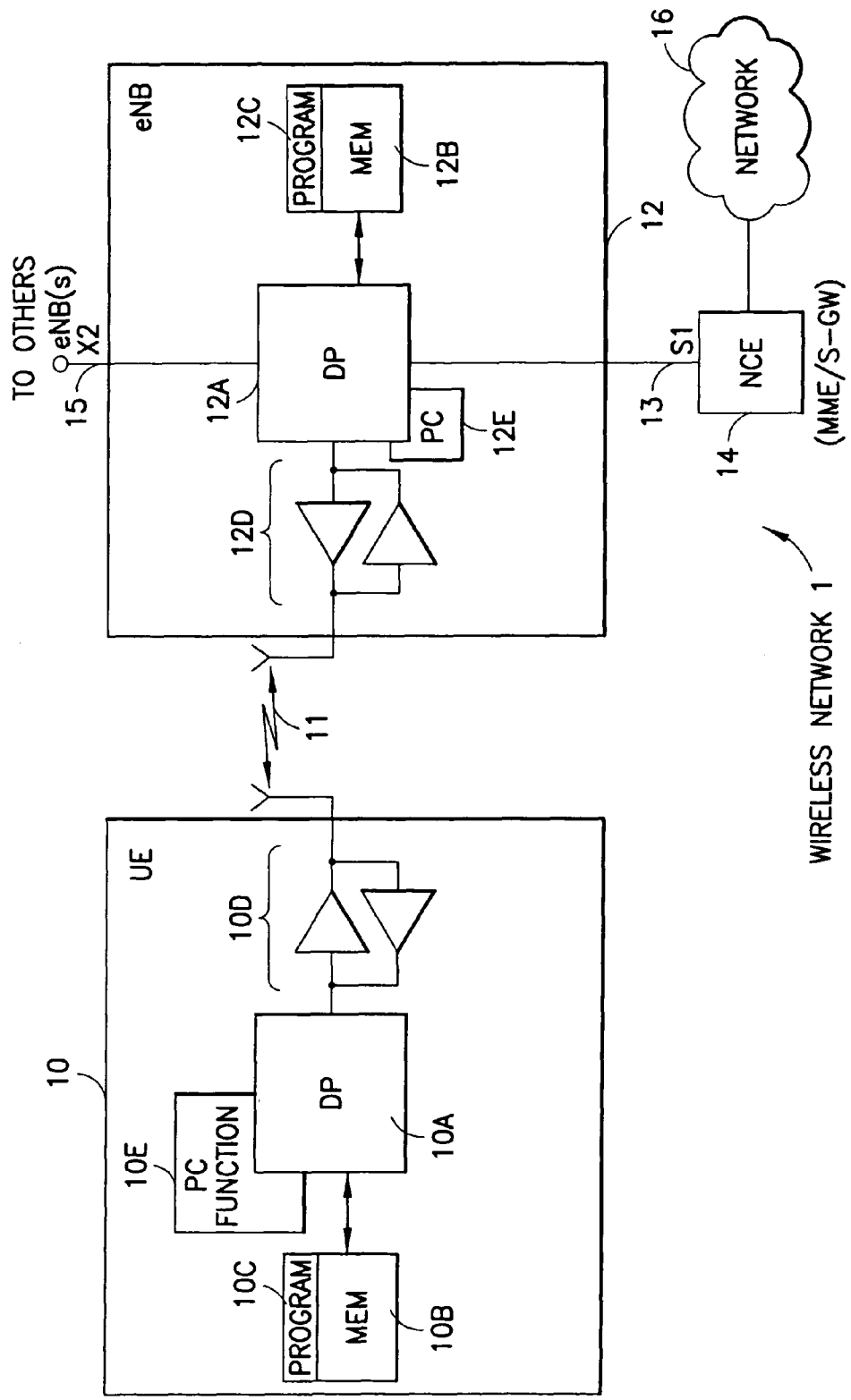
FIG. 2 shows a simplified block diagram of various electronic devices that are suitable for use in practicing the exemplary embodiments of this invention.

The terms $M_{PUSCH}$(i) and $\Delta_{TF}$(TF(i)) in equation [5] are the same terms as in equation [1]. Like equation [1], $P_{Msg3}$ is the minimum of $P_{MAX}$ and the above summation, but $P_{MAX}$ is not explicitly shown at equation [5]. Note that $\Delta_{TF}$(TF(i)) is calculated at the UE from signalling the UE receives (e.g., $\alpha$ and $K_S$), and that for the case where $\alpha$=1 full path loss compensation is used in this Message 3 power, just as for the preamble power. Different from equation [1] is the equation [5] term $\Delta_{0,preamble\_Msg3}$ which corresponds to a typical power offset between a Message 3 and the preamble whose power corresponds to the detection threshold. The term $\Delta_{0,preamble\_Msg3}$ can be a parameter broadcast in System Information or it could be specified in the appropriate wireless standard governing RACH procedures and pre-stored in the UE's memory. The term $\Delta_{PC\_Msg3}$ is the power control command included in the preamble response (e.g., Message 2), and as above the eNB may signal it directly or more likely as a short bit sequence that is an index which the UE uses to access a lookup table for the true value. It is here named differently than the corresponding parameter $\Delta_{PC}$ of the first embodiment above because this power control command of the second embodiment is applicable only to Message 3 or to the PUSCH transmissions following Message 3, whereas the parameter $\Delta_{PC}$ initializes the PC system for all the UL transmissions. After transmitting Message 3 or soon after that the UE should move to using Eq. [1] of the normal PUSCH power control. For this purpose, the UE could report as early as possible, preferably already in Message 3, the power offset between the used power and the power calculated with the PC Equation 1. More generally, the UE can report as early as Message 3 the power difference (or an indication of the difference) between the second power (the transmit power of Message 3 from equation [5]) which was computed using full pathloss compensation, and a fractional computation of the second power (e.g., if the power for Message 3 were instead computed using equation [1]). With this knowledge, the eNB could then initialize the UE specific constants. The UE could also report other parameters that are unknown to eNB and provide same information e.g., power rampup value and pathloss or power rampup, power headroom and max UE power (UE power class). From a signalling point of view reporting the difference of the two formulas is most efficient. Alternative to reporting one or more parameters, the UE could, after transmitting Message 3, apply the first embodiment, equating $\Delta_{PC}$ to $\Delta_{PC\_Msg3}$ in Equations 4a and 4b Reference is now made to FIG. 2 for illustrating a simplified block diagram of various electronic devices that are suitable for use in practicing the exemplary embodiments of this invention. In FIG. 2 a wireless network 1 is adapted for communication with an apparatus, such as a mobile communication device which may be referred to as a UE 10, via a network access node, such as a Node B (base station), and more specifically an eNB 12. The network 1 may include a network control element (NCE) 14 that may include the MME/S-GW functionality shown in FIG. 1A, and which provides connectivity with a network 16, such as a telephone network and/or a data communications network (e.g., the internet). The UE 10 includes a data processor (DP) 10A, a memory (MEM) 10B that stores a program (PROG) 10C, and a suitable radio frequency (RF) transceiver 10D for bidirectional wireless communications with the eNB 12, which also includes a DP 12A, a MEM 12B that stores a PROG 12C, and a suitable RF transceiver 12D. The eNB 12 is coupled via a data path 13 to the NCE 14, which may be implemented as the S1 interface shown in FIG. 1A. An instance of the X2 interface 15 may be present for coupling to another eNB (not shown). At least the PROG 12C may be assumed to include program instructions that, when executed by the associated DP 12A, enable the electronic device to operate in accordance with the exemplary embodiments of this invention, as detailed above and in the process diagram described below.

The exemplary embodiments of this invention may be implemented at least in part by computer software executable by the DP 10A of the UE 10, or by hardware, or by a combination of software and hardware (and firmware).

For the purposes of describing the exemplary embodiments of this invention the UE 10 may be assumed to also include a power control PC functional unit 10E, and the eNB 12 also includes a PC functional unit 12E. The PC functional units 10E, 12E, which may be in embodied as software stored in the MEM 10B, 12B, or as circuitry or some combination of computer software and hardware (and firmware), are assumed to be constructed and operated in accordance with the exemplary embodiments of this invention.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Typically there will be a plurality of UEs 10 serviced by the eNB 12. The UEs 10 may or may not be identically constructed, but in general are all assumed to be electrically and logically compatible with the relevant network protocols and standards needed for operation in the wireless network 1.

From the perspective of the UE, exemplary embodiments of this invention encompass a method; an apparatus that includes a processor, memory, transmitter and receiver; and a memory embodying a computer program; that operate to compute a first power using a first power control technique (algorithm) that is a function of a first variable (e.g., rampup power, $\Delta P_{rampup}$), to send a preamble of an access request message with the first power, in response to the access request message to receive a second message (e.g., Message 2) that includes a power control command ($\Delta P_{PC}$ or a bit sequence indicating it), to compute a second power using a different second power control technique (algorithm) that is initiated with a function of the first variable and of the received power control indication, and to send a third message using the second power. In a specific embodiment, the function is the sum of $\Delta P_{rampup}$ and $\Delta P_{PC}$ which is plugged into equation [1] above. Other parameters of equation [1] are known: $M_{PUSCH}(i)$ is known from the UE's resource allocation it gets in Message 2; the nominal portion $P_{O\_NOMINAL\_PUSCH}(j)$ of $P_{O\_PUSCH}(j)$ is received in a broadcast in the cell, as is $\alpha$ and $K_S$ from which $\Delta_{TF}(TF(i))$ is calculated; and PL is estimated by the UE itself such as from Message 2. If the UE has started the Random Access procedure in order to make a handover, it has received the parameters $P_{O\_NOMINAL\_PUSCH}(j)$ and $\alpha$ in the handover command. Similar holds true for equation [2] and PUCCH. The end result for initializing equation [1] with the summed terms $\Delta P_{PC}+\Delta P_{rampup}$ would then be:

$$P_{PUSCH}(0)=\min\{P_{MAX}, 10\log_{10}(M_{PUSCH}(0))+ P_{O\_NOMINAL\_PUSCH}(j)+\alpha\cdot PL+\Delta_{TF}(TF(0))+ \Delta P_{PC}+\Delta P_{rampup}\}$$

Further details and implementations are described particularly below with reference to FIG. 3.

The exemplary embodiment of the power control algorithms can be described in more detail as having the steps of (referring to the process flow diagram of FIG. 3):

302: the UE estimates path loss for communication with an eNB;

304: the UE computes a first power control value using a first power control technique (full path loss compensation) according to the estimated path loss (PL estimated from a received DL transmission), a target power ($P_{target}$) broadcast in the cell, and a ramp-up power value ($\Delta P_{rampup}$);

306: the UE sends on a first channel a first message to the eNB with power ($P_{preamble}=P_{target}+PL+\Delta P_{rampup}$, for the preamble of that message) according to the computed first power control value (this is an access request message sent on a RACH);

308: the eNB receives the first message and replies on a second channel (the DL-SCH/PDCCH) with a second message (Message 2) that includes an uplink resource allocation for the UE and a power control command ($\Delta P_{PC}$) for the UE;

310: the UE receives the second message and computes a second power control value ($P_{PUSCH}(0)$) using a second power control technique (fractional power control/fractional pathloss compensation) using the received power control command ($\Delta P_{PC}$) and initialized with a function (sum) of the power control command ($\Delta P_{PC}$) and the ramp-up power value ($\Delta P_{rampup}$) {e.g., the second power is given by equation [1] with substitutions using the equality of equation [4a]};

312: the UE sends data on a second channel (the PUSCH of the uplink resource allocation) using the second power control value ($P_{PUSCH}(0)$)

314: the UE may also or alternatively compute a third power control value ($P_{PUCCH}(0)$) that is initialized identically to the second power control value above and send control information to the eNB using that third power control value on a shared uplink control channel (PUCCH) {e.g., the third power is given by equation [2] with substitutions using the equality of equation [4b]}.

Alternative to block 310, the UE can send the data at block 312 on the allocated resource using a second power value ($P_{Msg3}$) that the UE calculates using an offset ($\Delta_{0,preamble\_Msg3}$) from the first power value and the received power control command ($\Delta_{PC\_Msg3}$), scaling the power according to the allocated payload size and the number of assigned resource blocks according to equation [5]. This alternative includes a switching to the normal PUSCH PC equation [1] after the transmission of the Message 3. Such a switch-over can be done after the UE has reported parameter values for initializing of the UE specific constants. Alternatively to reporting parameters, the UE can take the Eq. [1] in use by initializing the PC parameters immediately after the Message 3 transmission as in block 310, substituting $\Delta P_{PC} = \Delta_{PC\_Msg3}$.

There is also the embodiment noted above in which Message 3 is the first or initial message sent on PUSCH with its transmit power computed as in equation [5], and further transmissions are sent with power accumulated according to equation [1]. This is shown at FIG. 4 with actions undertaken at the UE side of the UE/network divide are as follows:

- 402, initialize for i=0 a first power control adjustment state g(0) for an uplink control channel and a second power control adjustment state f(i) for an uplink shared channel to each reflect an open loop power control error;
- 404: compute an initial transmit power for the uplink shared channel using full pathloss compensation, wherein the initial transmit power depends on a preamble power of a first message sent on an access channel {e.g., preamble power of the RACH access request preamble}, and is initialized with the second power control adjustment state f(0) {e.g., equation [5]}; and
- 406: send from a transmitter a third message {e.g., Message 3} on the uplink shared channel {e.g., PUSCH} at the initial transmit power.

Figure 4:
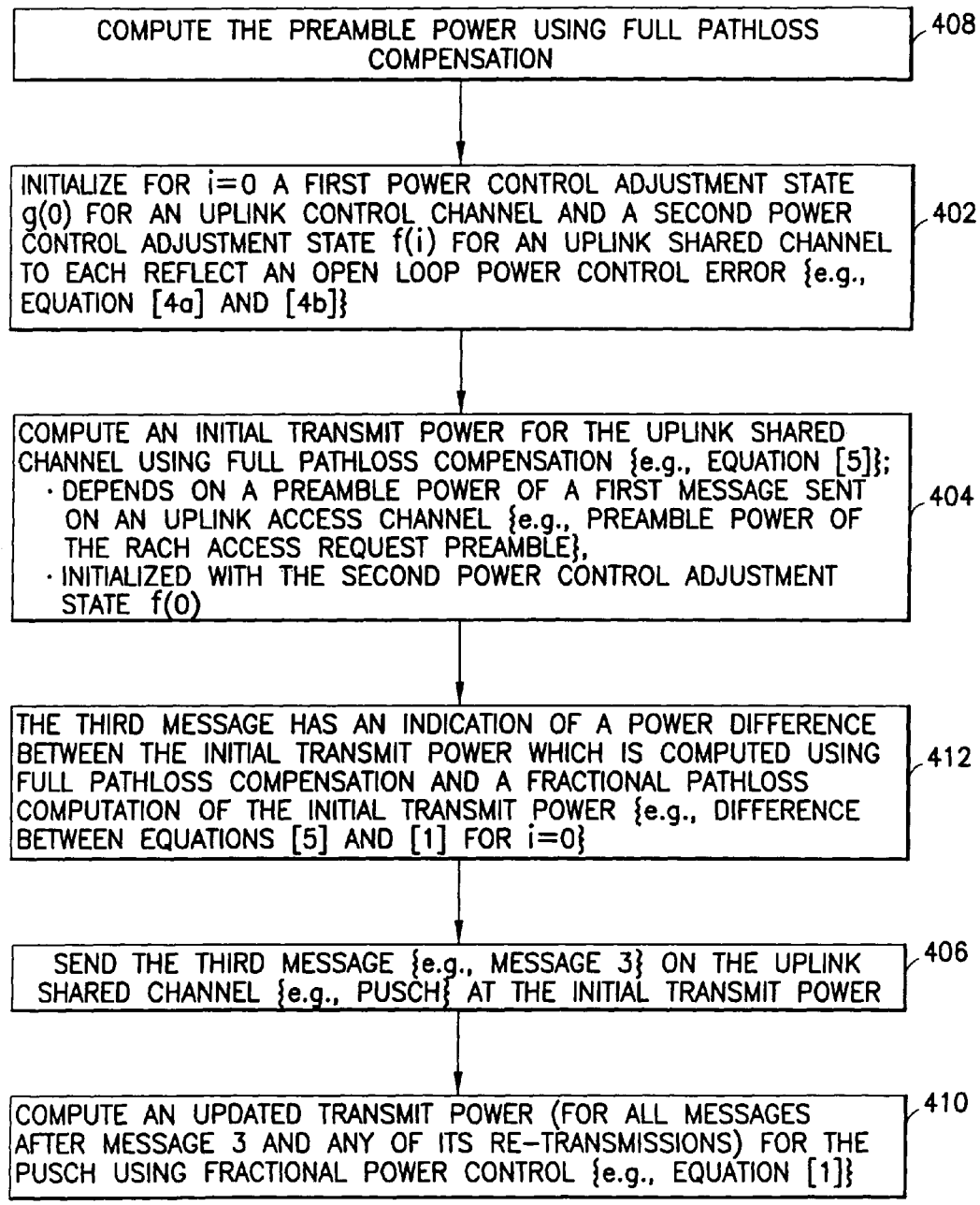

Additional optional features and/or implementation details for FIG. 4 include:

- 408: the preamble power is computed using full pathloss compensation,
- 410: compute an updated transmit power (for all messages after Message3 and any of its re-transmissions) for the shared uplink channel using fractional power control {e.g., equation [1]}, and the UE sends subsequent messages (those after Message3 and any re-transmissions of it) on the PUSCH using the updated transmit power, and
- 412: the third message comprises an indication of a power difference between the initial transmit power which is computed using full pathloss compensation and a fractional pathloss computation of the initial transmit power {e.g., difference between computations from equations [5] and [1] for i=0}.

Figure 3:
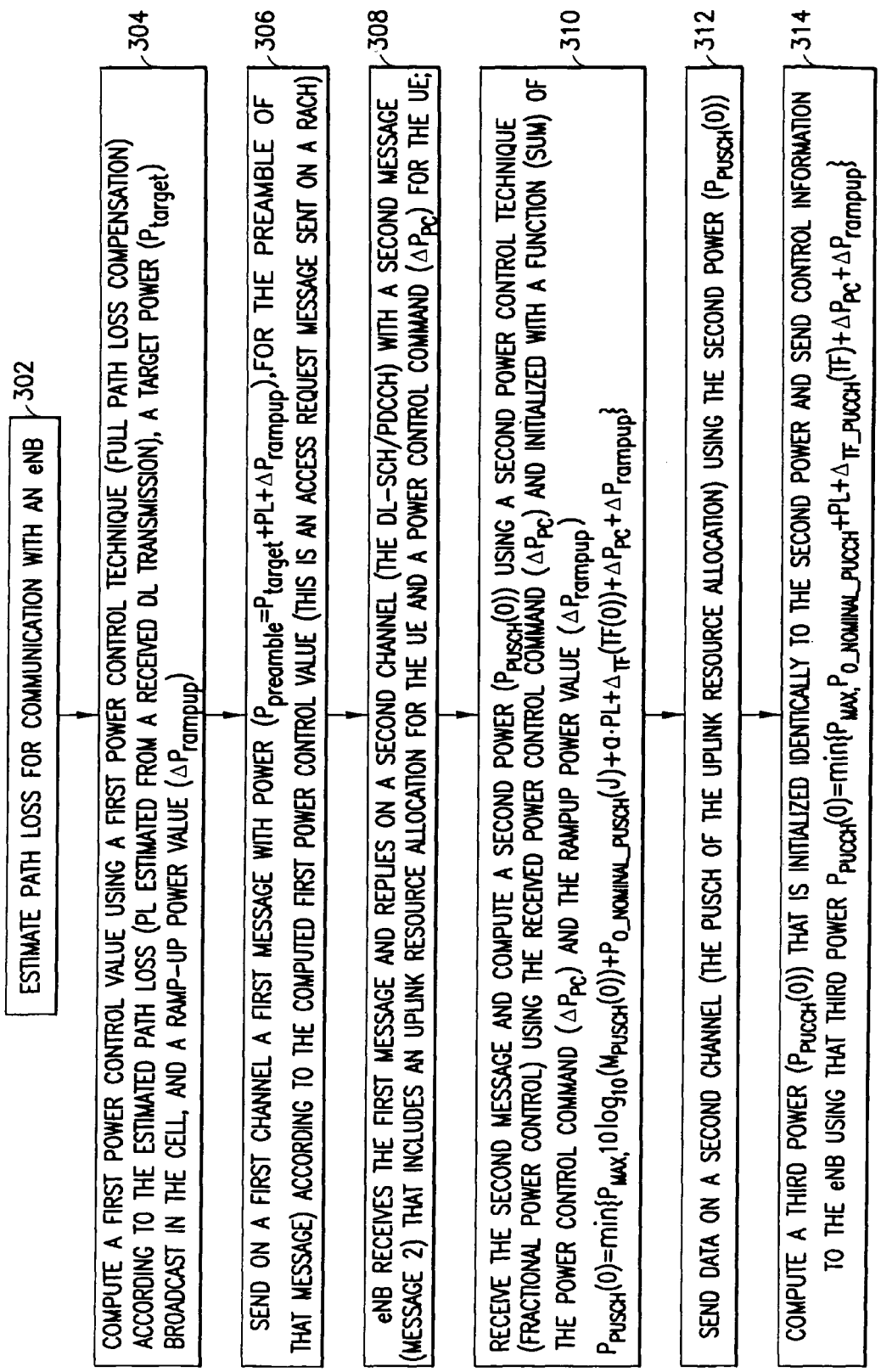
FIGS. 3-4 are logical flow diagrams that illustrate the operation of methods, and the result of execution of computer programs instructions by the data processor such as that shown in FIG. 2 according to various specific embodiments of the invention.

Note that the various blocks shown in FIGS. 3-4 for a particular entity (UE or eNB) may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. For example, certain steps shown in FIG. 3 may be executed in other than the order shown, and certain of the computations described may be performed in other ways. However, all such and similar modifications of the teachings of this invention will still fall within the scope of this invention.

Further, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other types of wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

We claim:

1. A method comprising:
   using a processor to initialize for i=0 a first power control adjustment state g(i) for an uplink control channel and a second power control adjustment state f(i) for an uplink shared channel to each reflect an open loop power control error;
   using the processor to compute an initial transmit power for the uplink shared channel using full path loss compensation, wherein the initial transmit power depends on a preamble power of a first message sent on an access channel and the second power control adjustment state f(0); and sending from a transmitter a third message on the uplink shared channel at the initial transmit power;

wherein the second power control adjustment state f(i) for i=0 is initialized as:

$$P_{0\_UE\_PUSCH}+f(0)=\Delta P_{PC}+\Delta P_{rampup};$$

in which:

$P_{0\_UE\_PUSCH}$ is a power control constant for the uplink shared channel that is specific for a user equipment executing the method;

$\Delta P_{rampup}$ is a ramp-up power for preamble transmissions; and $\Delta P_{PC}$ is a power control command indicated in a second message that is received in response to sending the first message.

2. The method according to claim 1, wherein the first message comprises a random access request message, the method further comprising:

computing the preamble power using full path loss compensation, sending from the transmitter on the access channel the first message and in response receiving at a receiver a second message that comprises an allocation of resources on which the third message is sent;

and after sending the third message, the method further comprises using the processor to compute an updated transmit power for the uplink shared channel using fractional power control and sending from the transmitter a subsequent message on the uplink shared channel using the updated transmit power.

3. The method according to claim 1, wherein the first power control adjustment state g(i) for i=0 is initialized as:

$$P_{0\_UE\_PUCCH}+g(0)=\Delta P_{PC}+\Delta P_{rampup};$$

wherein: $P_{0\_UE\_PUCCH}$ is a power control constant for the uplink control channel power that is specific for a user equipment executing the method.

4. The method according to claim 3, wherein $P_{0\_UE\_PUSCH}=P_{0\_UE\_PUCCH}=0$ when computing initial values at i=0 of power control states for the respective shared and control channels.

5. The method according to claim 1, wherein the initial transmit power $P_{Msg3}$ of the third message for i=0 is equal to:

$$P_{Msg3}=\min\{P_{max},P_{preamble}+\Delta_{0,preamble\_Msg3}+\Delta_{PC\_Msg3}+10\log_{10}(M_{PUSCH}(i))+\Delta_{TF}(TF(i))\};$$

in which:

$P_{MAX}$ is a maximum allowed transmission power;
$P_{preamble}$ is the preamble power of the first message;
$M_{PUSCH}(i)$ is determined from an uplink resource allocation of a second message received in response to sending the first message;
$\Delta_{TF}(TF(i))$ is calculated from received signaling;
$\Delta_{PC\_Msg3}$ is indicated by a power control command received at the receiver; and
$\Delta_{0,preamble\_Msg3}$ is an offset from the preamble power.

6. A method according to claim 5, further comprising, after sending the third message, using the processor to compute an updated transmit power for the shared uplink channel using fractional power control and sending from the transmitter a subsequent message on the uplink shared channel using the updated transmit power, wherein the updated transmit power $P_{PUSCH}(i)$ is equal to:

$$P_{PUSCH}(i)=\min\{P_{MAX},10\log_{10}(M_{PUSCH}(i)+P_{O\_PUSCH}(j)+\alpha\cdot PL+\Delta_{TF}(TF(i)+f(i)\};$$

wherein:

$P_{O\_PUSCH}(j)$ is calculated from received signaling,
$\alpha$ or an indication of $\alpha$ is received in signaling, and
PL is path loss that is estimated from received signaling.

7. The method according to claim 6, wherein $\alpha=1$ for the third message and for all retransmissions of the third message indicating full path loss compensation, and $\alpha<1$ for messages after the third message and all retransmissions of the third message indicating fractional path loss compensation.

8. The method according to claim 7, executed by a user equipment; and wherein the third message comprises an indication of a power difference between the initial transmit power which is computed using full path loss compensation and a fractional path loss computation of the initial transmit power.

9. A computer readable memory storing a computer program that when executed by a processor results in actions comprising:

initializing for i=0 a first power control adjustment state g(i) for an uplink control channel and a second accumulation power control adjustment state f(i) for an uplink shared channel to each reflect an open loop power control error;

computing an initial transmit power for the uplink shared channel using full path loss compensation, wherein the initial transmit power depends on a preamble power of a first message sent on an access channel and the second power control adjustment state f(0); and outputting the initial transmit power for transmission of a third message on the uplink shared channel;

wherein the second accumulation power control adjustment state f(i) for i=0 is initialized as:

$$P_{0\_UE\_PUSCH}+f(0)=\Delta P_{PC}+\Delta P_{rampup};$$

in which:

$P_{0\_UE\_PUSCH}$ is a power control constant for the uplink shared channel that is specific for a user equipment which sends the first and third messages;

$\Delta P_{rampup}$ is a ramp-up power for preamble transmissions; and $\Delta P_{PC}$ is a power control command indicated in a second message that is received in response to the first message.

10. An apparatus comprising:

a processor; and
a memory storing a computer program;

in which the processor is configured with the memory and the computer program to cause the apparatus to:

initialize for i=0 a first power control adjustment state g(i) for an uplink control channel and a second accumulation power control adjustment state f(i) for an uplink shared channel to each reflect an open loop power control error, and compute an initial transmit power for the uplink shared channel using full path loss compensation, wherein the initial transmit power depends on a preamble power of a first message sent on an access channel and the second power control adjustment state f(0); and compile a third message to be sent on the uplink shared channel at the initial transmit power;

wherein the second power control adjustment state f(i) for i=0 is initialized as:

$$P_{0\_UE\_PUSCH}+f(0)=\Delta P_{PC}+\Delta P_{rampup};$$

in which:

$P_{0\_UE\_PUSCH}$ is a power control constant for the uplink shared channel that is specific for a user equipment;

$\Delta P_{rampup}$ is a ramp-up power for preamble transmissions; and $\Delta P_{PC}$ is a power control command indicated in a second message received at a receiver of the apparatus in response to the transmitter sending the first message.

11. The apparatus according to claim 10, wherein the first message comprises a random access request message, and:

the processor is configured with the memory and the computer program to compute the preamble power using full path loss compensation, the apparatus further comprising a transmitter is configured to send on the access channel the first message;

the apparatus further comprising a receiver configured to receive, in response to the transmitter sending the first message, a second message that comprises an allocation of resources on which the third message is sent;

the processor with the memory and the computer program is configured, after the transmitter sends the third message, to compute an updated transmit power for the uplink shared channel using fractional power control;

and the transmitter is configured to send a subsequent message on the uplink shared channel using the updated transmit power.

12. The apparatus according to claim 10, wherein the first power control adjustment state g(i) for i=0 is initialized as:

$$P_{0\_UE\_PUCCH}+g(0)=\Delta P_{PC}+\Delta P_{rampup};$$

wherein: $P_{O\_UE\_PUCCH}$ is a power control constant for the uplink control channel that is specific for a user equipment.

13. The apparatus according to claim 12, wherein $P_{0\_UE\_PUSCH}=P_{O\_UE\_PUCCH}=0$ when the processor computes initial values at i=0 of power control states for the respective shared and control channels.

14. The apparatus according to claim 10, wherein the initial transmit power $P_{Msg3}$ for i=0 is equal to:

$$P_{Msg3}=\min\{P_{max},P_{preamble}+\Delta_{0,preamble\_Msg3}+\Delta_{PC\_Msg3}+10\log_{10}(M_{PUSCH}(i))+\Delta_{TF}(TF(i))\};$$

in which:

$P_{MAX}$ is a maximum allowed transmission power;

$P_{preamble}$ is the preamble power of the first message;

$M_{PUSCH}(i)$ is determined from an uplink resource allocation of a second message received in response to sending the first message;

$\Delta_{TF}(TF(i))$ is calculated from received signaling;

$\Delta_{PC\_Msg3}$ is indicated by a power control command received at the receiver; and $\Delta_{0,preamble\_Msg3}$ is an offset from the preamble power.

15. The apparatus according to claim 14, wherein the processor is configured with the memory and the computer program to compute an updated transmit power for the shared uplink channel using fractional power control and the transmitter is configured to send from the transmitter a subsequent message on the uplink shared channel using the updated transmit power, wherein the updated transmit power $P_{PUSCH}(i)$ is equal to:

$$P_{PUSCH}(i)=\min\{P_{MAX},10\log_{10}(M_{PUSCH}(i))+P_{O\_PUSCH}(j)+\alpha \cdot PL+\Delta_{TF}(TF(i))+f(i)\};$$

wherein:

$P_{O\_PUSCH}$ (j) is calculated from received signaling, $\alpha$ or an indication of $\alpha$ is received in signaling, and PL is path loss that is estimated from received signaling.

16. The apparatus according to claim 15, wherein $\alpha=1$ for the third message and for all retransmissions of the third message indicating full path loss compensation, and $\alpha<1$ for messages after the third message and all retransmissions of the third message indicating fractional path loss compensation.

17. The apparatus according to claim 15, in which the apparatus comprises a user equipment, and wherein the third message comprises an indication of a power difference between the initial transmit power which is computed using full path loss compensation and a fractional path loss computation of the initial transmit power.

* * * * *